(12) United States Patent
Drerup et al.

(10) Patent No.: US 12,511,677 B2
(45) Date of Patent: Dec. 30, 2025

(54) AUTOMATED POLICY FUNCTION ADJUSTMENT USING REINFORCEMENT LEARNING ALGORITHM

(71) Applicant: Maplebear Inc., San Francisco, CA (US)

(72) Inventors: Tilman Drerup, Palo Alto, CA (US); Nour Alkhatib, Mississauga (CA); Jonathan Gu, San Francisco, CA (US); Amin Akbari, San Francisco, CA (US); Changyao Chen, New York, NY (US)

(73) Assignee: Maplebear Inc., San Francisco, CA (US)

( * ) Notice: Subject to any disclaimer, the term of this patent is extended or adjusted under 35 U.S.C. 154(b) by 268 days.

(21) Appl. No.: 18/108,916

(22) Filed: Feb. 13, 2023

(65) Prior Publication Data

US 2023/0298080 A1 Sep. 21, 2023

Related U.S. Application Data

(60) Provisional application No. 63/310,022, filed on Feb. 14, 2022.

(51) Int. Cl.
*G06Q 30/00* (2023.01)
*G06N 3/092* (2023.01)
*G06Q 30/0601* (2023.01)

(52) U.S. Cl.
CPC ......... *G06Q 30/0617* (2013.01); *G06N 3/092* (2023.01)

(58) Field of Classification Search
CPC ..... G06Q 30/06–08; G06N 3/08; G06N 3/092
See application file for complete search history.

(56) References Cited

U.S. PATENT DOCUMENTS

| 11,715,042 B1* | 8/2023 | Liu | G06N 3/006 |
| | | | 705/26.1 |
| 2016/0210655 A1* | 7/2016 | Cottle | G06Q 30/0273 |
| 2021/0073647 A1* | 3/2021 | Hunter | G06N 3/086 |

(Continued)

OTHER PUBLICATIONS

Vargese, N., & Mahmoud, Q., "A Survey of Multi-Task Deep Reinforcement Learning", Electronics 9.9: 1363 MDPI AG, 2020 (Year: 2020).*

*Primary Examiner* — Ethan D Civan
(74) *Attorney, Agent, or Firm* — Fenwick & West LLP

(57) ABSTRACT

An online system may receive, from a content provider, a content presentation campaign that includes one or more objectives. The online system may define a set of one or more policy functions that automatically controls the content presentation campaign. A policy function may control one or more criteria in bidding content slots. The online system may monitor a realized outcome of the content presentation campaign. The online system may apply a reinforcement learning algorithm in adjusting the set of policy functions. The reinforcement learning algorithm adjusts one or more parameters in the set of policy functions to reduce a difference between the realized outcome and the desired outcome set by the content provider. The online system generates an adjusted set of policy functions and uses the adjusted set of policy functions in bidding content slots to present one or more content items provided by the content provider.

20 Claims, 5 Drawing Sheets

(56) References Cited

U.S. PATENT DOCUMENTS

| | | | |
|---|---|---|---|
| 2021/0182976 A1* | 6/2021 | Poslavsky | G06Q 20/386 |
| 2022/0043742 A1* | 2/2022 | van Adelsberg | G06F 11/3476 |
| 2022/0044299 A1* | 2/2022 | Tate | G06Q 10/087 |

* cited by examiner

AUTOMATED POLICY FUNCTION ADJUSTMENT USING REINFORCEMENT LEARNING ALGORITHM

CROSS REFERENCE TO RELATED APPLICATION

This application claims the benefit of U.S. Provisional Application No. 63/310,022, filed Feb. 14, 2022, which is incorporated by reference herein in its entirety.

BACKGROUND

This disclosure generally relates to training techniques in training specialized machine learning models, and more specifically, to techniques associated with reinforcement learning algorithms.

In a large-scale online system, the system may need to manage numerous items and users who have different behaviors, usage patterns and preferences. The system may include complex relationships among different objects being tracked by the system. While a given relationship may provide lots of insights as to each user, the data relationships are often complex and hard to be quantified. It is challenging to monitor user preferences concretely and provide high-quality recommendations to take various actions in such a large-scale online system. For even more complex situations, such as where content is presented dynamically with multiple parties providing content to various end users, the optimization of these processes may involve factors that may be changed dynamically, from parties adjusting those factors manually to various algorithms changing values at a fast pace. Because of these and other issues, it is often challenging for a conventional system to present content that achieves one or more objectives of the content provider, especially when trying to optimize for power consumption, network bandwidth usage, and other computing architecture/operational performance considerations

SUMMARY

In accordance with one or more aspects of the disclosure, an online system may receive, from a content provider, a content presentation campaign that includes one or more objectives set by the content provider. At least one of the objectives defines a desired outcome. The online system may define a set of one or more policy functions that automatically control the content presentation campaign. A policy function may control one or more criteria in bidding content slots of the online system. The online system may monitor a realized outcome of the content presentation campaign that is controlled by the set of policy functions. The online system may apply a reinforcement learning algorithm in adjusting the set of policy functions. The reinforcement learning algorithm adjusts one or more parameters in the set of policy functions to reduce the difference between the realized outcome of the content presentation campaign and the desired outcome set by the content provider. The online system generates an adjusted set of policy functions by the reinforcement learning algorithm and uses the adjusted set of policy functions in bidding content slots to present one or more content items provided by the content provider.

DETAILED DESCRIPTION

Figure 1:
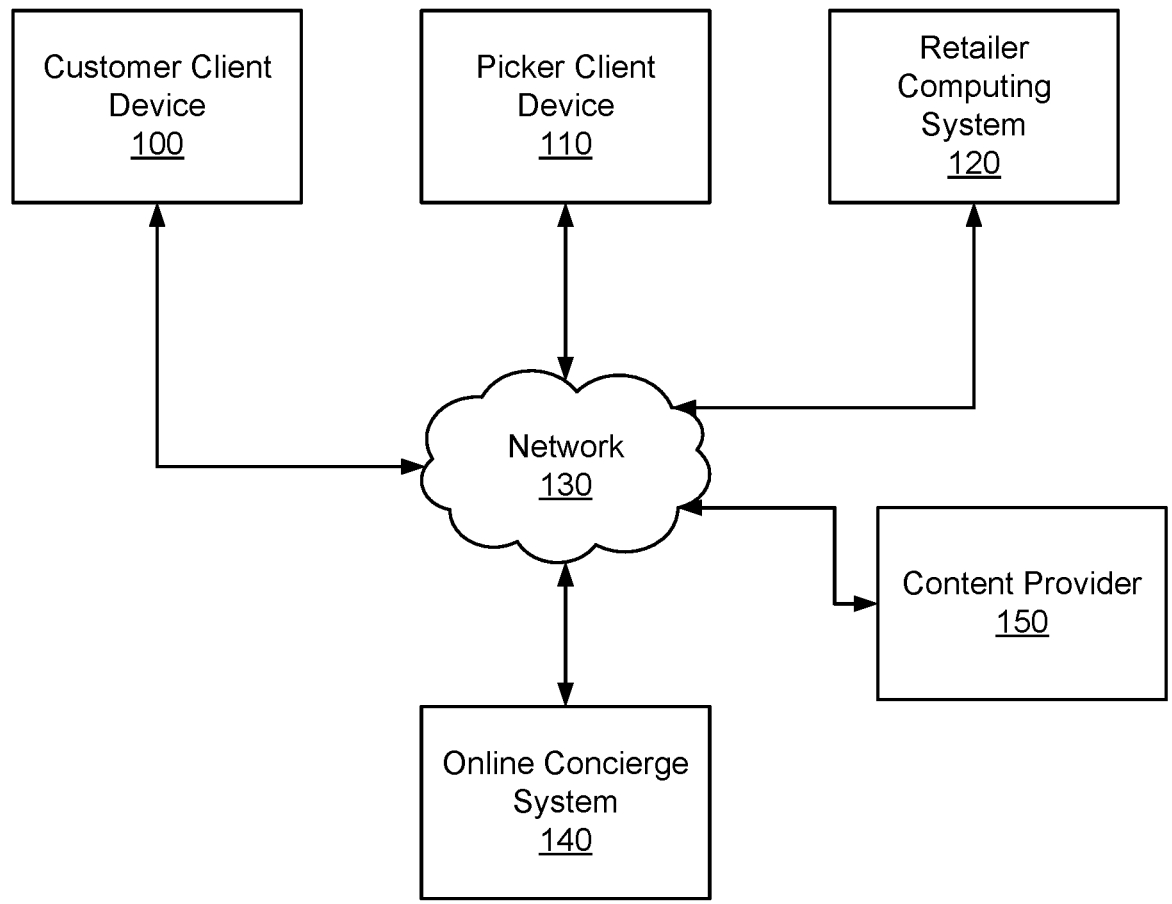
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item", as used herein, means a good or product that can be provided to the customer through the online concierge system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

A content provider 150 may be an entity that provides one or more content items to the online concierge system 140. A content provider may be a retailer that operates the retailer computing system 120 or another entity that offers products at one or more retail locations. For example, a content provider may be a supplier of various products, such as a manufacturer, a brand, or a distributor. The content provider may launch a campaign to promote the entity and/or the products offered by the entity. The content item to be presented by the online concierge system 140 may be content items that represent the content provider entity or the offered products. For example, a retailer may promote its new retail location by setting up a content presentation campaign with the online concierge system 140 to promote the retail location with images and banners of the retail location at the online concierge system 140. In another example, the brand may intend to promote its products by setting up a content presentation campaign to put images of its products at more prominent locations of the online concierge system 140, such as at the top of a product search result. The content provider 150 may use an automated bidding algorithm provided by the online concierge system 140 to delegate the operation of the content presentation campaign to the online concierge system 140. The content provider 150 may set one or more objectives of the content presentation campaign. The online concierge system 140 defines and adjusts one or more bidding policy functions to automate the bidding process for the content provider 150 using a reinforcement learning algorithm. The detail of the reinforcement learning algorithm is discussed in further detail in FIG. 3 through FIG. 5.

The customer client device 100, the picker client device 110, the retailer computing system 120, a content provider 150 and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer's client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
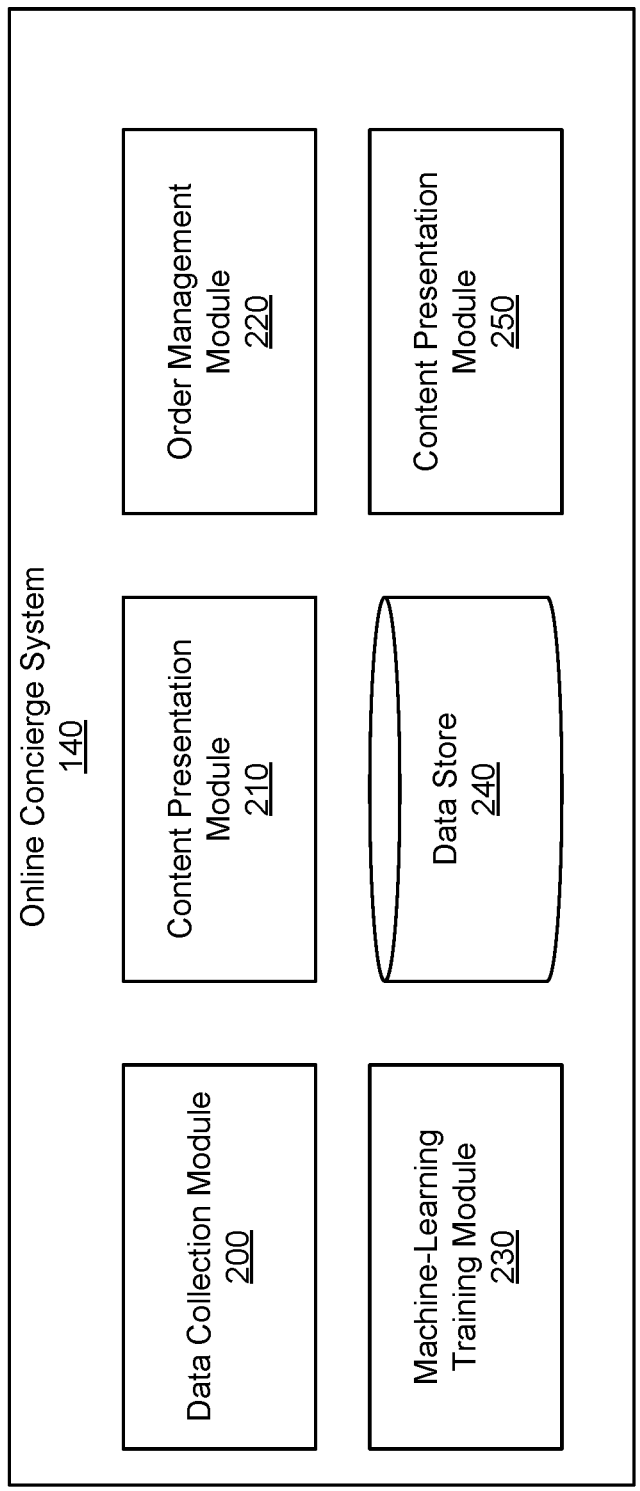
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine learning training module 230, a data store 240, and a content presentation module 250. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has services orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is free text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 that manages orders for items from customers. The order management module 220 receives orders from a customer client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine learning training module 230 trains machine learning models used by the online concierge system 140. The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross entropy loss function. The machine learning training module 230 updates the set of parameters for the machine learning model based on the score generated by the loss function. For example, the machine learning training module 230 may apply gradient descent to update the set of parameters.

The data store 240 stores data used by the online concierge system 140. For example, the data store 240 stores customer data, item data, order data, and picker data for use by the online concierge system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

The content presentation module 250 automates the presentation of content items (e.g., items representing products) for a content provider using a set of policy functions. The content provider may define one or more objectives for a content presentation campaign. The content presentation module 250 may use a reinforcement learning algorithm to adjust the set of policy functions to improve the content presentation campaign. The policy functions may be adjusted in a direction that allows the content presentation campaign to generate outcomes that track the objectives set forth by the content provider as closely as possible. Details of the policy functions and reinforcement learning algorithm are described in FIG. 3 through FIG. 5.

Overview of a Reinforcement Learning Algorithm

Figure 3:
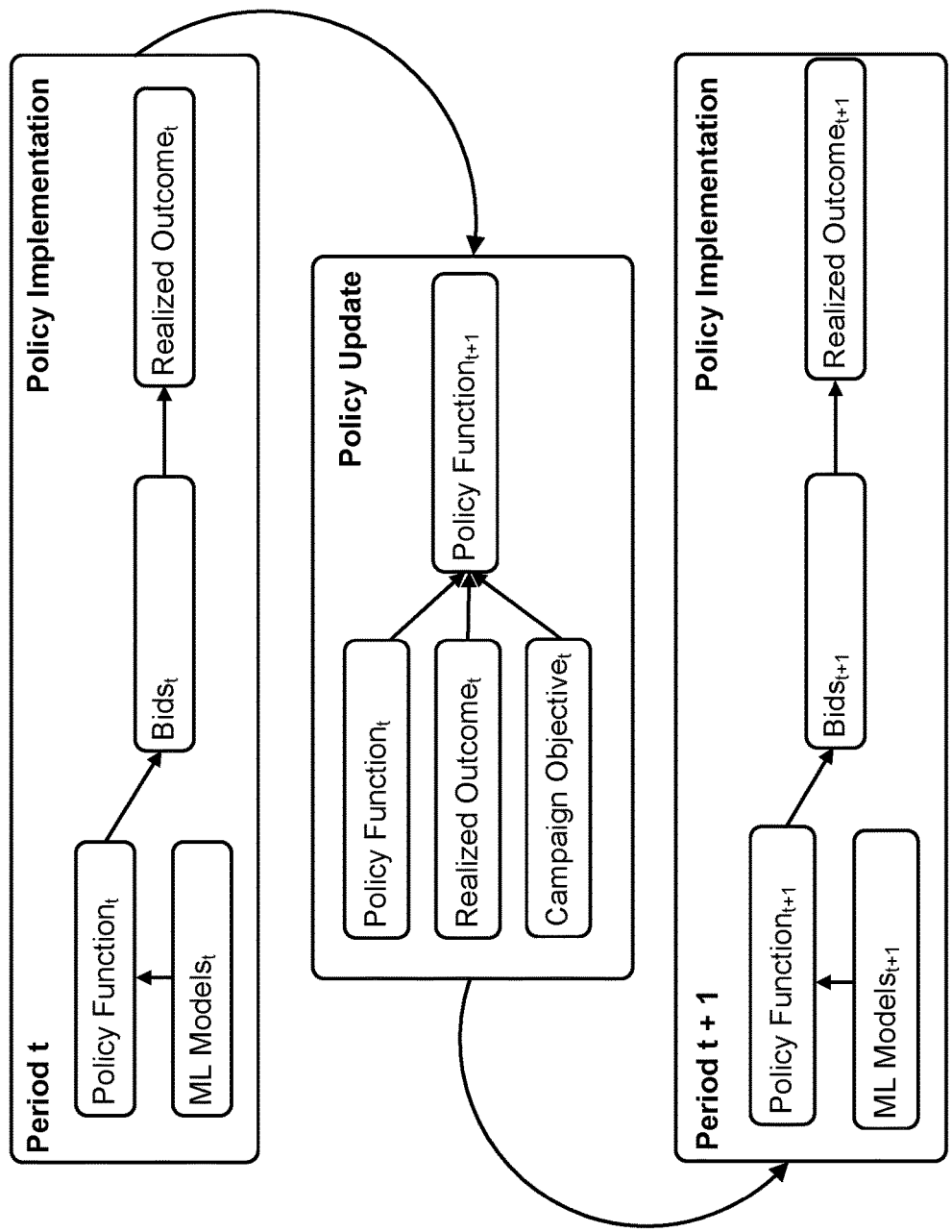
FIG. 3 is a block diagram illustrating an example overview of a reinforcement learning algorithm's logic and components, in accordance with some embodiments.

FIG. 3 is a block diagram illustrating an example overview of a reinforcement learning algorithm's logic and components, in accordance with some embodiments. The reinforcement learning algorithm may be used to refine a tool that automates the bidding process of a content presentation campaign for a content provider. The bidding process may rely on a set of policy functions that automatically determine the bid amount given a particular content slot. The online concierge system 140 may offer the content provider to define one or several objectives (e.g., maximize clicks, target a specific return on investment, or limit spending below a certain amount). Based on the objectives, the online concierge system 140 automatically determines and refines the bidding algorithm to implement the objectives on behalf of the content provider.

In some embodiments, the online concierge system 140 implements a reinforcement learning algorithm to adjust the bidding algorithms to target the content provider's objects. The algorithm takes the content provider's objectives as inputs and implements the objectives through objective-specific policy functions. The online concierge system 140 uses reinforcement learning to continuously track how close the realized objectives come to the desired value. At frequent intervals, the online concierge system 140 assesses the differences between realized outcomes and the desired objectives. In turn, the online concierge system 140 updates the parameters of the policy functions iteratively to move the realized outcomes in the direction of the desired objectives.

In some embodiments, for a given content presentation campaign, the campaign contains one or several products that a content provider wants to bid on. A product may refer to anything that a content provider might want to bid on, including but not limited to products to be shown on a website or links to be shown in a search engine. A campaign may include some collection of products that are associated with a specific set of objectives. The bidding algorithms associated with the content presentation campaign may operate in an environment that can change dramatically over time due to variables outside of the algorithms' control (e.g., changing auction environment, changes in campaign setup). The online concierge system 140 uses an adaptive system that improves the bidding algorithms to address various challenges in implementing an automatic bidding algorithm.

In some embodiments, a bidding algorithm may include one or more policy functions. Policy functions may express bids as a function of a set of inputs. The set of inputs may include the objectives as defined by the content providers and various estimates, which may be determined by one or more machine learning models. At regular intervals, the algorithm evaluates how good the current iteration of the policy function is in bringing the realized outcome close to the outcome desired by the content provider. In turn, the reinforcement learning algorithm may counterfactually estimate how the expected outcome would change if the policy function were changed in different ways, using the previous policy functions and realized outcomes as input. The reinforcement learning algorithm replaces the current policy function with an adjusted version that is estimated to bring realized and desired outcomes closer to each other when implemented.

FIG. 3 provides an overview of the reinforcement learning algorithm's logic and components, in accordance with some embodiments. In some embodiments, there can be different component types that make up the building blocks of the reinforcement learning algorithm. Example component types include estimates, objectives, outcomes and policies.

In some embodiments, estimates are outputs of one or more machine learning models or simulations of a given product and content slot combination. The estimates may be used as inputs for a policy function. Examples of estimates include expected sales per click for a given user type or an estimate of the bid landscape. The estimates can have granularity down to the level of a combination of product and auction. For example, the algorithm can operate and set bids at the level of individual auctions of content slots.

Objectives are the goals (e.g., maximize sales or target a cost per action) and constraints (e.g., total spending limit, per bid spending limit) set by the content provider. Objectives can change over time and be high-dimensional. For example, a campaign can have a variety of contemporaneous objects and these can change over time.

Outcomes indicate realizations of a content presentation campaign's performance. Outcomes can include metrics such as realized sales, realized cost-per-click, and realized budget spending. The outcomes can be measured at the level of campaigns or individual products.

Policy functions define the automatic bidding algorithm. Policy functions are functions that map estimates, outcomes, and objectives into bids. While in this disclosure various example policy functions are simplified for illustration purposes, policy functions can become arbitrarily complex and can include further algorithms.

FIG. 3 graphically illustrates how policy functions map inputs into bid amounts. A policy function sets bids in a given period of time t. In some embodiments, policy functions are fixed in a given time period. However, the bid amounts are not fixed and are varied based on the setting and context of the content slot auction. In some embodiments, policy functions define a mapping between inputs and bids. The inputs of a policy function may vary drastically due to changes in context. A policy function can produce bids at arbitrary levels of granularity.

In some embodiments, policy functions are rules for determining bid amounts for a fixed period of time. As shown in FIG. 3, the reinforcement learning algorithm revisits the rules in the policy functions to update the functions. The online concierge system 140 changes one or more parameters and/or parameter values in a way that is expected to bring a content presentation campaign's realized outcomes closer to the desired outcomes.

A content presentation campaign may be associated with more than one policy function. For example, the content provider may set up multiple objectives for a content presentation campaign. Different campaign objectives may require different policy functions. In some embodiments, a policy function represents how bids need to be set to bring a content presentation campaign's outcome close to objectives specified by the content provider. The functional form of a policy function may be determined by the designer of the algorithm or may be determined automatically.

By way of example, consider the following simple example of a policy function designed to implement a cost-per-action target:

$$\text{bid} = a * \text{CPA\_target} * \text{prob\_coversion} \qquad \text{(Eq. 1)}$$

In this example, the policy function maps the cost-per-action target (CPA_target) and an estimate of the probability of conversion (prob_conversion) into a bid. The parameter "a" controls the shape of the function. All else equal, an increase in "a" will increase the bids that the policy function provides. The probability of conversion is an estimate that may be determined by a machine learning model and may vary from one setting to another. The parameter "a" may be a value that is adjusted by the reinforcement learning algorithm.

Figure 4A:
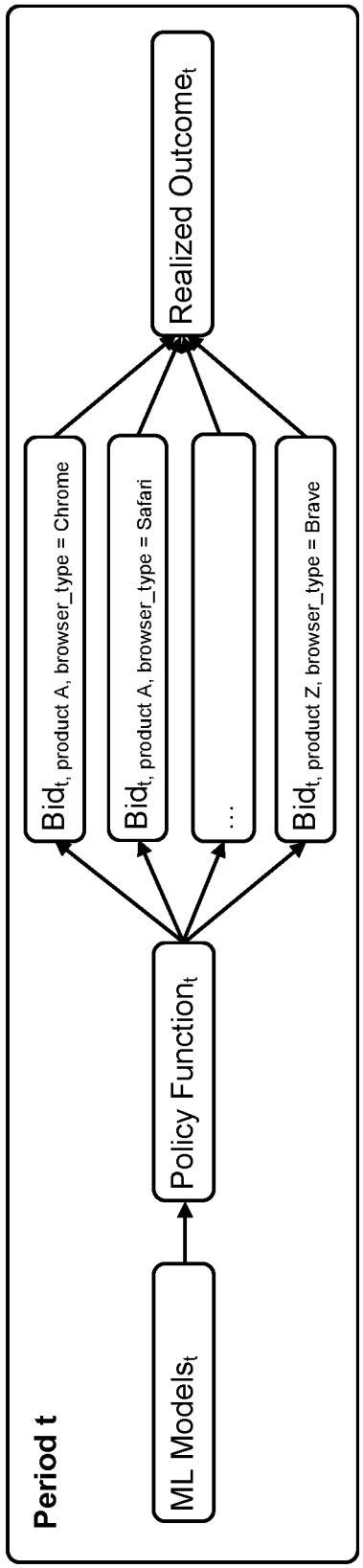
FIG. 4A is a conceptual diagram illustrating the use of a policy function at a given time period to generate a plurality of bids.

As shown in FIG. 3, a policy function may ingest output estimates from machine learning models as inputs. The nature of the inputs may be based on data availability, technical restrictions, and objectives. In complex versions of policy functions, the inputs may be generated by deep neural networks that make predictions at the level of individual auctions. FIG. 4A is a conceptual diagram illustrating the use of a policy function at a given time period to generate a plurality of bids. Each bid may be associated with a different product and other contextual information such as browser type. The online concierge system 140 may monitor the consumers' actions after being presented with the content items. The possible actions may include clicking the content item, adding a product represented by the content item into a shopping cart, purchasing the product, etc.

A policy function may be associated with different states. Each state may correspond to a past version of the policy function in which the outcomes of the policy function were measured and recorded. The reinforcement learning algorithm uses the past actions and past outcomes of a policy function to adjust the policy function in a direction that improves the policy function.

Figure 4B:
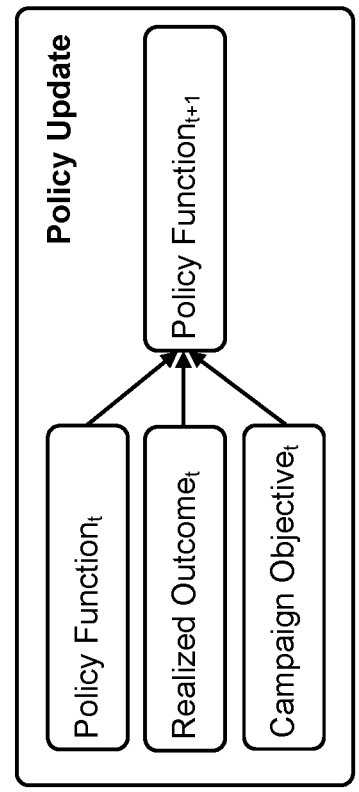
FIG. 4B is a conceptual diagram illustrating how a policy function may be updated, in accordance with some embodiments.

FIG. 4B is a conceptual diagram illustrating how a policy function may be updated, in accordance with some embodiments. In transitioning from time t to time t+1, the online concierge system 140 may update the policy functions through counterfactual policy estimation. To perform this update, the reinforcement learning algorithm may first collect the old policy function, the content provider's specified objective, and the realized campaign outcome. The reinforcement learning algorithm creates a revised version of the policy function using the old policy function, the realized outcome and the campaign objective. The counterfactual policy estimation can be model-based or heuristic-based. The reinforcement learning algorithm estimates how the policy function should be adjusted to bring realized and desired objectives closer together in the next period. For example, the heuristic-based reinforcement learning algorithm may define a rule in adjusting a parameter in a policy function. The algorithm may examine the policy function at a previous state that has a known realized outcome. The algorithm may adjust the parameter based on the rule and the known realized outcome of the previous state.

Using the policy function as illustrated in Equation 1 as an example, the reinforcement learning algorithm may collect data on realized cost-per-action and desired cost-per-action. The reinforcement learning algorithm may specify how the parameter "a" needs to be updated depending on what the realized cost-per-action and desired cost-per-action are. An example updating rule can be a heuristic rule as defined below:

$$a_{t+1} = a_t * \text{CPA\_target\_desired}_t / \text{CPA\_target\_realized}_t \qquad \text{Eq (2)}$$

In equation (2), the reinforcement learning algorithm may increase bids in proportion to the ratio of desired cost-per-action and realized cost-per-action. If the desired value exceeds the realized value by X %, for example, the algorithm may increase the value of parameter "a" by X % to compensate.

The example illustrated in equations (1) and (2) may be a simplified version of a policy function for the purpose of illustration. The policy function may include one or more parameters and may be adjusted using various reinforcement learning techniques.

Example Policy Function Adjustment Process

Figure 5:
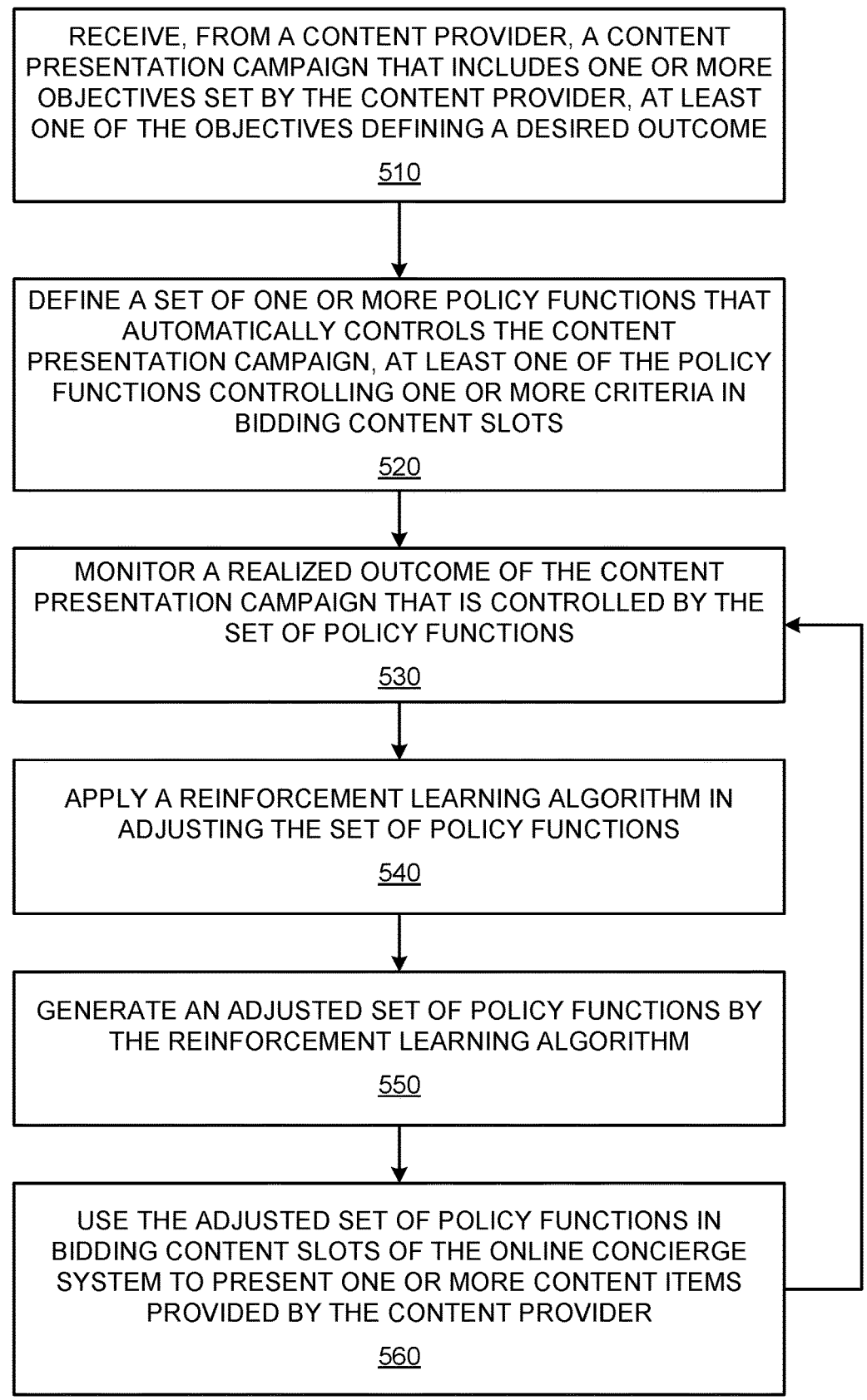
FIG. 5 is a flowchart depicting an example process for adjusting policy functions associated with a content presentation campaign using a reinforcement learning algorithm, in accordance with some embodiments.

FIG. 5 is a flowchart depicting an example process 500 for adjusting policy functions associated with a content presentation campaign using a reinforcement learning algorithm, in accordance with some embodiments. Alternative embodiments may include more, fewer, or different steps from those illustrated in process 500, and the steps may be performed in a different order from that illustrated in process 500. These steps may be performed by an online concierge system (e.g., online concierge system 140). Additionally, each of these steps may be performed automatically by the online concierge system without human intervention.

In some embodiments, the online concierge system 140 receives 510, from a content provider, a content presentation campaign. For example, the content provider may set up the content presentation campaign at a portal provided by the online concierge system 140. The content presentation campaign may include one or more content items and objectives set by the content provider that define the goals of the campaign. One or more content items may be sponsored content items that are presented based on bid prices. For example, the online concierge system 140 may determine that an opportunity to present a sponsored content item is available at a content item slot. The online concierge system 140 allows various content providers to bid for the slot. The online concierge system 140 presents the sponsored content item of the winner of the bid. A content presentation campaign may define an objective-oriented campaign to compete for various content slots of the online concierge system 140.

For a content presentation campaign, an online concierge system 140 may obtain a set of content items for display to users of the online concierge system 140. The content items may be received from the content provider, which may operate one or more third party systems external to the online concierge system 140 (e.g., a website in a domain different from a domain of the online concierge system 140, such as a website corresponding to a warehouse). A content provider may be a business that wants to promote its business at the online concierge system 140, a product supplier for a warehouse, a company that sells products at the online concierge system 140, or any suitable party. A content provider may also generate content items or may be generated by the online concierge system 140. For example, a content item from a third party system identifies a warehouse and a product for purchase from the warehouse. In another example, the online concierge system 140 generates content items for one or more products offered for purchase from a warehouse. For instance, a content item may be a product that is offered by a business when a user searches for a product that competes with the product offered by the business. A content item may include one or more prompts for the user to perform one or more interactions with the online concierge system 140. Example interactions include adding a product identified by the content item to an order, viewing information about a product identified by the content item, accessing a warehouse corresponding to the order, or any other suitable interaction by the user with the online concierge system 140.

A content presentation campaign that includes one or more objectives set by the content provider. An objective may define a desired outcome. The objective is set by the content provider when the content provider sets up the content presentation campaign. The objectives may include goals and/or constraints for the content presentation campaign. Goals may include one or more metrics that measure the content presentation campaign, such as maximizing sales, promoting user interactions, targeting a metric to reach a certain value, etc. Constraints may include limits to the content presentation campaign, such as the maximum amount to be spent, etc. The objectives of the campaign may change over time.

In some embodiments, the online concierge system 140 defines 520 a set of one or more policy functions that automatically controls the content presentation campaign. A policy function may control one or more criteria in bidding on the content slots offered by the online concierge system 140. A policy function may receive estimates associated with the content slot and the content item to be presented and may generate a proposed amount of bid as an output. The estimates may be specific to a pair of a given certain content item and a slot. The estimates may include the expected sales per click for a given user type, an estimate of the bid landscape, the expected number of user interactions associated with the slot, etc. The policy function may be a formula, an algorithm, or a model that determines the bid price to be used for bidding a slot given various estimates associated with the particular combination of slot, content item to be presented, and user.

The estimates that are used as inputs of a policy function may be determined by one or more machine learning models. For example, a machine learning model may receive a plurality of features that correspond to the specific combination of slot, content item, and customer user. The features may include customer features that are associated with the customer user (the user that is about to receive the content item), content item features that are associated with the content item, and setting features that are associated with the search term used by the customer, historical order data, slot data, bid data, and historical actions after users seeing content items in a slot. The precise categorization of the features may vary depending on embodiments. The features may be quantified and normalized and turned into one or more feature vectors.

The customer features may include any features that are related to customers. The customers may include the particular customer who makes the selection and other customers, such as those the online concierge system 140 determines to be similar to the particular customer, such as the same type of customers based on one or more metrics, such as age ranges, locations, purchase histories, etc. The features may include the search and purchase history of a customer. For example, if a particular customer typically performs a product search using the online concierge system 140 in selecting or browsing products, the features may include the actions taken by the customer after a content item is presented. The online concierge system 140 may also determine, among all of the searches that a customer has performed, the frequency of the searches related to a type of content item. The online concierge system 140 may also monitor whether the customer searched for a brand, etc. Alternatively, or additionally, customer features may include the profile of the customer. Alternatively, or additionally, the features may include past transaction records of the customer. The transaction records may include browsing history, order history, replacement history, etc.

The content item features may include any features that are related to content items. The content items may be products that are offered by the content provider such as products that the content provider would like to place at an easier-to-spot location (e.g., the top of a search result) when the online concierge system 140 presents one or more content items to the customer. The products may include the particular product that is selected by a customer or other products, such as those products that are similar to the particular product. For example, the features may include the type of product. The type of product may be defined under a taxonomy of products. Under the taxonomy, the features may include an identification of the product type and identification of the number of similar products available. Each product type may be assigned a degree of brand-dependent uniqueness, depending on the nature of the product. Alternatively, or additionally, the features may include the customers who purchased the product. The record of customers who purchase the product may provide an indication of whether the particular customer to be presented with the content item will take actions on the content item. Alternatively, or additionally, the features may include features related to a particular brand associated with the selected product. Certain brands may be perceived as premium brands, specialty brands, organic brands, or other brands that may have records of brand loyalty or generally increased popularity among other alternative products. Other brands may be perceived as more generic brands such as private label brands. Alternatively, or additionally, the features may include prices, sizes, and quantities of the product, such as the price difference between the selected product and an alternative product, the size difference, the quantity difference, etc. Alternatively, or additionally, the features may include the number of alternatives available and other contextual information.

The setting features may include any features that are related to the context and setting of the slot that is about to present a content item. The opportunity of a slot ready for presentation may come up in different settings for the online concierge system 140. For example, the online concierge system 140 may respond to a search query by the customer. The customer may search for a product. In response, the online concierge system 140 determines that there can be one or more slots that are available for bids by the content presentation campaign. For example, the online concierge system 140 determines that the content items in the content presentation campaign are relevant to the search and can be one of the candidates to be presented. In another example, the customer may be in the process of building an order and selecting various products. Slots may be available for the online concierge system 140 to suggest similar products. In yet another example, slots may be present in various features of the online concierge system 140 such as content feeds, discussion pages, and other locations of the online concierge system 140. The setting features may describe the setting of the slot and the attributes of the slots. The setting features may also include action and order records of similar slots that were used to present products to other customers. The setting features may further include the search query used by the customer and other contextual information, such as the browser type, the device type, and other metadata related to the setting.

Various features may be inputted into a machine learning model to determine estimates that are relevant to a policy function. In various embodiments, a wide variety of machine learning techniques may be used. Examples include different forms of supervised learning, unsupervised learning, and semi-supervised learning such as decision trees, support vector machines (SVMs), regression, Bayesian networks, and genetic algorithms. Deep learning techniques such as neural networks, including convolutional neural networks (CNN), recurrent neural networks (RNN) and long short-term memory networks (LSTM), may also be used. Additional detail of the training of the machine learning model is further discussed below.

In some embodiments, a policy function is specific to a particular content presentation campaign and the inputs received by the policy function are learned or adjusted in an iterative process. In some embodiments, based on the types of inputs needed by the policy function, the online concierge system 140 may train a specific machine learning model to generate inputs needed for the policy function. For example, one policy function may determine a bid price based on the estimated user actions that may be performed by the customer after being presented with the content item. A machine learning model may be trained to generate this estimate. Another policy function may determine a bid price based on an estimated conversion rate. Since a different estimate is used, another machine learning model may be trained. A policy function may receive multiple types of estimates as inputs. One or more machine learning models may be trained to generate different types of estimates.

The policy function may control one or more criteria in bidding content slots. For example, in some cases, a policy function may directly control the bid amount based on the estimates inputted to the policy function. In other cases, a policy function may provide one or more metrics that may be used to determine the bid amount, which may be subject to other conditions and constraints. In yet other cases, a policy function may also determine whether the content provider should participate into a bid at all. A content presentation campaign may include a plurality of policy functions that correspond to various objectives defined by the content provider. The online concierge system 140 may determine the policy functions that are relevant to a particular combination of content slot and content item. The relevant policy functions may in cooperation generate one or more criteria to determine the bid amount.

In some embodiments, the online concierge system 140 monitors 530 a realized outcome of the content presentation campaign that is controlled by a set of one or more policy functions. The policy functions may be iteratively refined and improved based on the outcomes of the content presentation campaign. A realized outcome may be the recorded outcome of the content presentation campaign based on a particular iteration of the set of one or more policy functions. For example, the online concierge system 140 may monitor the outcomes of the content presentation campaign periodically. For a particular time period, the online concierge system 140 may place bids automatically on behalf of the content provider based on a particular iteration of the policy function set. The content presentation campaign is associated with one or more objectives that are set by the content provider. The objectives may be expressed by various metrics, such as user interaction rate, revenue, conversion rate, impression rate, the number of times content items are presented, user reviews, and any other suitable metrics. For the period of time, the online concierge system 140 may measure the actual outcome of the content presentation campaign using those metrics. The actual outcome may be compared to the desired outcome as set by the content provider.

In some embodiments, the online concierge system 140 applies 540 a reinforcement learning algorithm in adjusting the set of policy functions. The reinforcement learning algorithm may adjust one or more parameters in the set of policy functions to reduce the difference between the realized outcome of the content presentation campaign and the desired outcome set by the content provider. The difference may be defined by subtraction, ratio, or another suitable relationship. In various embodiments, the online concierge system 140 may use various reinforcement learning techniques to adjust the policy functions. For example, the reinforcement learning algorithm may be ruled based, heuristic, and/or model based. For example, the online concierge system 140 may define a rule that the value of a parameter in a particular policy function should be increased given a metric value in the realized outcome is lower than the targeted value in the desired outcome defined in an objective. In some embodiments, multiple parameters and outcome metrics are involved in one or more policy functions. The online concierge system 140 may use various machine learning techniques, such as backpropagation to refine the policy functions.

In some embodiments, the online concierge system 140 may adjust a policy function using a counterfactual policy estimation technique as discussed above. The reinforcement learning algorithm may be implemented using any suitable machine learning technique, such as Q-learning, State-action-reward-state-action (SARSA), or deep reinforcement learning. The counterfactual policy estimation technique may include state-aware techniques such as SARSA. The algorithm may be trained using historical data on the performance of past content presentation campaigns, or it may be updated in real-time based on the performance of the current campaign. In some embodiments, the online concierge system 140 may define a loss function for a policy function. The online concierge system 140 may repeatedly backpropagate the difference between the realized outcome of the content presentation campaign and the desired outcome set by the content provider through the policy function. Other suitable ways of adjusting the values of the loss function may also be used. One or more parameters of the policy function may be modified through any suitable technique from the backpropagation, such as gradient descent. The backpropagation of one or more error terms may be repeated by the online concierge system 140 until the loss function satisfies one or more criteria or the algorithm has converged. In such cases, the reinforcement learning process for a particular iteration may be considered completed. In response, the online concierge system 140 stores the set of parameters for the particular iteration of the policy function.

The online concierge system 140 generates 550 an adjusted set of policy functions by the reinforcement learning algorithm. The adjusted set of policy functions may include new parameter values that are adjusted to project a new realized outcome that is closer to the desired outcome. In some embodiments, the adjusted set of policy functions may also include new parameters. The online concierge system 140 may add or remove one or more parameters from a policy function through the reinforcement learning process. The adjusted set of policy functions may be saved as a particular state of the set of policy functions. In some embodiments, the reinforcement learning algorithm may have state awareness. For a particular policy function, a state may correspond to a particular combination of parameter values at a given iteration. The online concierge system 140 monitors the desired outcome of the policy function given by the state. When adjusting the parameters of a policy function, the reinforcement learning algorithm may take into account the performance of the policy function in previous states to adjust the policy function in a direction that is predicted to generate an outcome closer to the desired outcome.

In some embodiments, the online concierge system 140 uses 560 the adjusted set of policy functions in bidding content slots of the online concierge system 140 to present one or more content items provided by the content provider. The adjusted set of policy functions may be used for a period of time until the online concierge system 140 collects sufficient realized outcome data for this particular iteration of the policy function set. The process 500 may be repeated for another iteration by repeating step 530 through step 560 to continue to refine and improve the policy functions. In bidding on a content slot, the online concierge system 140 may generate, using the policy function set, a bid price on behalf of the content provider. There may be other content providers competing for the content slot. Some content providers may manually enter a bid price while other content providers may use an automatic process described in process 500. The online concierge system 140 may select the content provider with the highest bid price to present the content item provided by the content provider.

Example Machine Learning Techniques

In various embodiments, a wide variety of machine learning techniques may be used. Examples include different forms of supervised learning, unsupervised learning, and semi-supervised learning such as decision trees, support vector machines (SVMs), regression, Bayesian networks, and genetic algorithms. Deep learning techniques such as neural networks, including convolutional neural networks (CNN), recurrent neural networks (RNN) and long short-term memory networks (LSTM), may also be used. Various reinforcement learning techniques, such as Q-learning, State-action-reward-state-action (SARSA), or deep reinforcement learning, may also be used. For example, various estimates generated by machine learning models for policy function inputs, adjustment of policy functions, and other processes may apply one or more machine learning and deep learning techniques.

In various embodiments, the training techniques for a machine learning model may be supervised, semi-supervised, or unsupervised. In supervised learning, the machine learning models may be trained with a set of training samples that are labeled. For example, for a machine learning model trained to determine estimates for presenting content, the training samples may be a record of how past content items were presented. The labels for each training sample may be binary, multi-class, or continuous outcome. In training a machine learning model for determining estimates for presenting content, the training labels may include a positive label that indicates the customer has a positive interaction with the content item (e.g., a conversion, a click, or another targeted interaction) and a negative label that indicates the customer did not take any targeted action. In some embodiments, the training labels may also be multi-class such as the precise actions or non-action that was taken by the customer after being presented with a content item. In some embodiments, the training labels may also be continuous outcomes such as the number of items purchased by a customer after being presented with a content item.

By way of example, the training set may include multiple past records of content item presentation with known outcomes. Each training sample in the training set may correspond to a past and the corresponding outcome may serve as the label for the sample. A training sample may be represented as a feature vector that includes multiple dimensions. Each dimension may include data of a feature, which may be a quantized value of an attribute that describes the past record. For example, in a machine learning model that is used to determine estimates for presenting contents, the features in a feature vector may include customer features, content item features, setting features, etc. In various embodiments, certain pre-processing techniques may be used to normalize the values in different dimensions of the feature vector.

In some embodiments, an unsupervised learning technique may be used. The training samples used for an unsupervised model may also be represented by features vectors, but may not be labeled. Various unsupervised learning techniques such as clustering may be used in determining similarities among the feature vectors, thereby categorizing the training samples into different clusters. In some cases, the training may be semi-supervised with a training set having a mix of labeled samples and unlabeled samples.

A machine learning model may be associated with an objective function, which generates a metric value that describes the objective goal of the training process. The training process may intend to reduce the error rate of the model in generating predictions. In such a case, the objective function may monitor the error rate of the machine learning model. In a model that generates predictions, the objective function of the machine learning algorithm may be the training error rate when the predictions are compared to the actual labels. Such an objective function may be called a loss function. Other forms of objective functions may also be used, particularly for unsupervised learning models whose error rates are not easily determined due to the lack of labels. In some embodiments, in determining estimates related to how a customer may react after being presented with content items, the objective function may correspond to the error rate (e.g., differences) between the predicted estimate and the actual action recorded in the label. In various embodiments, the error rate may be measured as cross-entropy loss, L1 loss (e.g., the sum of absolute differences between the predicted values and the actual value), L2 loss (e.g., the sum of squared distances).

A neural network may be used to generate estimates. The neural network may receive an input and generate an output. The input may be the feature vector of a training sample in the training process and the feature vector of an actual case when the neural network is making an inference. The output may be the prediction, classification, or another determination performed by the neural network. The neural network may include different kinds of layers, such as convolutional layers, pooling layers, recurrent layers, fully connected layers, and custom layers. A convolutional layer convolves the input of the layer (e.g., an image of the content item) with one or more kernels to generate different types of images that are filtered by the kernels to generate feature maps. Each convolution result may be associated with an activation function. A convolutional layer may be followed by a pooling layer that selects the maximum value (max pooling) or average value (average pooling) from the portion of the input covered by the kernel size. The pooling layer reduces the spatial size of the extracted features. In some embodiments, a pair of the convolutional layer and the pooling layer may be followed by a recurrent layer that includes one or more feedback loops. The feedback may be used to account for spatial relationships of the features in an image or temporal relationships of the objects in the image. The layers may be followed by multiple fully connected layers that have nodes connected to each other. The fully connected layers may be used for classification and object detection. In one embodiment, one or more custom layers may also be presented for the generation of a specific format of the output. For example, a custom layer may be used for image segmentation for labeling pixels of an image input with different segment labels.

The order of layers and the number of layers of the neural network may vary in different embodiments. In various embodiments, a neural network includes one or more layers, but may or may not include any pooling layer or recurrent layer. If a pooling layer is present, not all convolutional layers are always followed by a pooling layer. A recurrent layer may also be positioned differently at other locations of the CNN. For each convolutional layer, the sizes of kernels (e.g., 3×3, 5×5, 7×7, etc.) and the numbers of kernels allowed to be learned may be different from other convolutional layers.

A machine learning model may include certain layers, nodes, kernels and/or coefficients. Training of a neural network may include forward propagation and backpropagation. Each layer in a neural network may include one or more nodes, which may be fully or partially connected to other nodes in adjacent layers. In forward propagation, the neural network performs the computation in the forward direction based on the outputs of a preceding layer. The operation of a node may be defined by one or more functions. The functions that define the operation of a node may include various computation operations such as convolution of data with one or more kernels, pooling, recurrent loop in RNN, various gates in LSTM, etc. The functions may also include an activation function that adjusts the weight of the output of the node. Nodes in different layers may be associated with different functions.

Training of a machine learning model may include an iterative process that includes iterations of making determinations, monitoring performance of the machine learning model using the objective function, and backpropagation to adjust the weights (e.g., weights, kernel values, coefficients) in various nodes. For example, a computing device may receive a training set. Each training sample in the training set may be assigned labels indicating the outcomes after a content item is presented. The computing device, in forward propagation, may use the machine learning model to generate a predicted outcome. The computing device may compare the predicted outcome with the labels of the training sample. The computing device may adjust, in a backpropagation, weights of the machine learning model based on the comparison. The computing device backpropagates one or more error terms obtained from one or more loss functions to update a set of parameters of the machine learning model. The backpropagating is performed through the machine learning model and one or more of the error terms based on a difference between a label in the training sample and the generated predicted value by the machine learning model.

By way of example, each of the functions in the neural network may be associated with different coefficients (e.g., weights and kernel coefficients) that are adjustable during training. In addition, some of the nodes in a neural network may also be associated with an activation function that decides the weight of the output of the node in forward propagation. Common activation functions may include step functions, linear functions, sigmoid functions, hyperbolic tangent functions (tanh), and rectified linear unit functions (ReLU). After an input is provided into the neural network and passes through a neural network in the forward direction, the results may be compared to the training labels or other values in the training set to determine the neural network's performance. The process of prediction may be repeated for other samples in the training sets to compute the value of the objective function in a particular training round. In turn, the neural network performs backpropagation by using gradient descent such as stochastic gradient descent (SGD) to adjust the coefficients in various functions to improve the value of the objective function.

Multiple rounds of forward propagation and backpropagation may be performed. Training may be completed when the objective function has become sufficiently stable (e.g., the machine learning model has converged) or after a predetermined number of rounds for a particular set of training samples.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method for creating an adaptive autonomous system, the method comprising:
   at an online concierge system comprising a processor and a computer-readable medium:
   receiving, by the online concierge system from a computer system associated with a content provider, a content presentation campaign that includes one or more objectives set by the content provider, at least one of the objectives defining a desired outcome;
   defining a set of one or more policy functions that automatically control the content presentation campaign, each policy function comprising one or more parameters and a plurality of states, each state corresponding to a previously used parameter configuration and an associated realized outcome of the content presentation campaign;
   monitoring a realized outcome of the content presentation campaign that is controlled by the set of policy functions;
   storing, by the online concierge system, data indicating the realized outcomes and the corresponding states of the policy functions associated with the campaign;
   applying a reinforcement learning algorithm that autonomously adjusts one or more parameters of the policy functions using a state-aware counterfactual estimation process that references previously stored states and corresponding outcomes to reduce a difference between the realized outcomes and the desired outcome set by the content provider;
   generating an adjusted set of policy functions by the reinforcement learning algorithm; and
   using the adjusted set of policy functions to control subsequent content selection operations of the online concierge system, thereby enabling autonomous system adaptation to changing campaign performance.

2. The method of claim 1, wherein using the adjusted set of policy functions comprises inputting estimates of a content slot to a first policy function of the policy functions to generate a bid value.

3. The method of claim 2, wherein inputting estimates of a content slot to the first policy function to generate the bid value comprises:
   generating a plurality of features related to the content slot;

inputting the plurality of features to a machine learning model to predict the estimate; and using the estimates generated by the machine learning model as inputs to the first policy function.

4. The method of claim 1, wherein the set of policy functions comprises a plurality of policy functions, each policy function being defined based on an objective provided by the content provider.

5. The method of claim 1, wherein at least one of the policy functions comprises a plurality of states that record past actions and outcomes associated with the policy function.

6. The method of claim 1, wherein the reinforcement learning algorithm updates the set of policy functions through a counterfactual policy estimation.

7. The method of claim 1, wherein the reinforcement learning algorithm is heuristic based, and wherein applying the heuristic based reinforcement learning algorithm comprises:

defining a rule in adjusting a parameter in a policy function;

examining the policy function at a previous state that has a known realized outcome; and adjusting the parameter based on the rule and the known realized outcome of the previous state.

8. The method of claim 1, wherein the reinforcement learning algorithm is a machine learning based.

9. The method of claim 1, wherein one of the content items in the content presentation campaign is a sponsored item offered on one or more interfaces hosted by the online concierge system.

10. A non-transitory computer readable medium configured to store code comprising instructions, the instructions, when executed by one or more processors, cause the one or more processors to:

receive, by an online concierge system from a computer system associated with a content provider, a content presentation campaign that includes one or more objectives set by the content provider, at least one of the objectives defining a desired outcome;

define a set of one or more policy functions that automatically control the content presentation campaign, each policy function comprising one or more parameters and a plurality of states, each state corresponding to a previously used parameter configuration and an associated realized outcome of the content presentation campaign;

monitor a realized outcome of the content presentation campaign that is controlled by the set of policy functions;

store, by the online concierge system, data indicating the realized outcomes and the corresponding states of the policy functions associated with the campaign;

apply a reinforcement learning algorithm that autonomously adjusts one or more parameters of the policy functions using a state-aware counterfactual estimation process that references previously stored states and corresponding outcomes to reduce a difference between the realized outcomes and the desired outcome set by the content provider;

generate an adjusted set of policy functions by the reinforcement learning algorithm; and use the adjusted set of policy functions to control subsequent content selection operations of the online concierge system, thereby enabling autonomous system adaptation to changing campaign performance.

11. The non-transitory computer readable medium of claim 10, wherein using the adjusted set of policy functions comprises inputting estimates of a content slot to a first policy function of the policy functions to generate a bid value.

12. The non-transitory computer readable medium of claim 11, inputting estimates of a content slot to the first policy function to generate the bid value comprises:

generating a plurality of features related to the content slot;

inputting the plurality of features to a machine learning model to predict the estimate; and using the estimates generated by the machine learning model as inputs to the first policy function.

13. The non-transitory computer readable medium of claim 10, wherein the set of policy functions comprises a plurality of policy functions, each policy function being defined based on an objective provided by the content provider.

14. The non-transitory computer readable medium of claim 10, wherein at least one of the policy functions comprises a plurality of states that record past actions and outcomes associated with the policy function.

15. The non-transitory computer readable medium of claim 10, wherein the reinforcement learning algorithm updates the set of policy functions through a counterfactual policy estimation.

16. The non-transitory computer readable medium of claim 10, wherein the reinforcement learning algorithm is heuristic based, and wherein applying the heuristic based reinforcement learning algorithm comprises:

defining a rule in adjusting a parameter in a policy function;

examining the policy function at a previous state that has a known realized outcome; and adjusting the parameter based on the rule and the known realized outcome of the previous state.

17. The non-transitory computer readable medium of claim 10, wherein the reinforcement learning algorithm is a machine learning based.

18. The non-transitory computer readable medium of claim 10, wherein one of the content items in the content presentation campaign is a sponsored item offered on one or more interfaces hosted by the online concierge system.

19. An online concierge system comprising:

one or more processors; and memory configured to store code comprising instructions, the instructions, when executed by the one or more processors, cause the one or more processors to:

receive, by an online concierge system from a computer system associated with a content provider, a content presentation campaign that includes one or more objectives set by the content provider, at least one of the objectives defining a desired outcome;

define a set of one or more policy functions that automatically control the content presentation campaign, each policy function comprising one or more parameters and a plurality of states, each state corresponding to a previously used parameter configuration and an associated realized outcome of the content presentation campaign;

monitor a realized outcome of the content presentation campaign that is controlled by the set of policy functions;

store, by the online concierge system, data indicating the realized outcomes and the corresponding states of the policy functions associated with the campaign;

apply a reinforcement learning algorithm that autonomously adjusts one or more parameters of the policy functions using a state-aware counterfactual estimation process that references previously stored states and corresponding outcomes to reduce a difference between the realized outcomes and the desired outcome set by the content provider;

generate an adjusted set of policy functions by the reinforcement learning algorithm; and use the adjusted set of policy functions to control subsequent content selection operations of the online concierge system, thereby enabling autonomous system adaptation to changing campaign performance.

20. The online concierge system of claim 19, wherein using the adjusted set of policy functions comprises inputting estimates of a content slot to a first policy function of the policy functions to generate a bid value.

* * * * *